(12) United States Patent
Cok et al.

(10) Patent No.: US 7,196,281 B2
(45) Date of Patent: Mar. 27, 2007

(54) RESISTIVE TOUCH SCREEN HAVING CONDUCTIVE MESH

(75) Inventors: Ronald S. Cok, Rochester, NY (US); Debasis Majumdar, Rochester, NY (US); Glen C. Irvin, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 136 days.

(21) Appl. No.: 10/987,882

(22) Filed: Nov. 12, 2004

(65) Prior Publication Data
US 2006/0102461 A1    May 18, 2006

(51) Int. Cl.
*H01H 1/10* (2006.01)

(52) U.S. Cl. .......... 200/512; 200/600; 29/622; 345/174

(58) Field of Classification Search ........... 200/5 R, 200/600, 511–512, 514; 29/622; 345/168, 345/173, 174–175
See application file for complete search history.

(56) References Cited

U.S. PATENT DOCUMENTS

| | | | |
|---|---|---|---|
| 4,220,815 A | 9/1980 | Gibson et al. | |
| 5,062,198 A | 11/1991 | Sun | |
| 2002/0094660 A1 | 7/2002 | Getz et al. | |
| 2003/0141118 A1 | 7/2003 | Kakuno | |
| 2004/0090426 A1 | 5/2004 | Bourdelais et al. | |
| 2004/0135775 A1 | 7/2004 | Hurst et al. | |
| 2006/0102452 A1 | 5/2006 | Cok et al. | |
| 2006/0102460 A1 | 5/2006 | Bourdelais et al. | |
| 2006/0102462 A1 | 5/2006 | Bourdelais et al. | |
| 2006/0102463 A1 | 5/2006 | Cok | |
| 2006/0103632 A1 | 5/2006 | Bourdelais et al. | |
| 2006/0105146 A1 | 5/2006 | Bourdelais et al. | |
| 2006/0105148 A1 | 5/2006 | Cok et al. | |
| 2006/0105152 A1 | 5/2006 | Cok et al. | |

FOREIGN PATENT DOCUMENTS

EP    1 471 415    10/2004

*Primary Examiner*—K. Lee
(74) *Attorney, Agent, or Firm*—Andrew J. Anderson

(57) ABSTRACT

A touch screen comprising: a) a substrate; b) a first conductive layer located on the substrate; c) a flexible sheet comprising a substantially planar surface and integral compressible spacer dots formed thereon, each integral compressible spacer dot having a base closest to the planar surface and a peak furthest from the planar surface; and d) a second conductive layer located on the surface of the flexible sheet, wherein the second conductive layer comprises a conductive mesh pattern and the peaks of the integral compressible spacer dots are located in non-conductive openings in the conductive mesh pattern; wherein when a minimum required activation force is applied to the touch screen at the location of one of the compressible spacer dots, the compressible spacer dot is compressed to allow electrical contact between the first and second conductive layers.

33 Claims, 6 Drawing Sheets

RESISTIVE TOUCH SCREEN HAVING CONDUCTIVE MESH

FIELD OF THE INVENTION

This invention relates to resistive touch screens and more particularly, to a flexible cover sheet and spacer dots separating the cover sheet from a substrate in a resistive touch screen.

BACKGROUND OF THE INVENTION

Resistive touch screens are widely used in conventional CRTs and in flat-panel display devices in computers and in particular with portable computers.

FIG. 3 shows a portion of a prior-art resistive touch screen 10 of the type shown in Published US Patent Application No. 2002/0094660A1, filed by Getz et al., Sep. 17, 2001, and published Jul. 18, 2002, which includes a rigid transparent substrate 12, having a first conductive layer 14. A flexible transparent cover sheet 16 includes a second conductive layer 18 that is physically separated from the first conductive layer 14 by spacer dots 20 formed on the second conductive layer 18 by screen printing Referring to FIG. 4, when the flexible transparent cover sheet 16 is deformed, for example by finger 13 pressure, to cause the first and second conductive layers to come into electrical contact, a voltage applied across the conductive layers 14 and 18 results in a flow of current proportional to the location of the contact. The conductive layers 14 and 18 have a resistance selected to optimize power usage and position sensing accuracy. The magnitude of this current is measured through connectors (not shown) connected to metal conductive patterns (not shown) formed on the edges of conductive layers 18 and 14 to locate the position of the deforming object.

Alternatively, it is known to form the spacer dots 20 for example by spraying through a mask or pneumatically sputtering small diameter transparent glass or polymer particles, as described in U.S. Pat. No. 5,062,198 issued to Sun, Nov. 5, 1991. The transparent glass or polymer particles are typically 45 microns in diameter or less and mixed with a transparent polymer adhesive in a volatile solvent before application. This process is relatively complex and expensive and the use of an additional material such as an adhesive can be expected to diminish the clarity of the touch screen. Such prior art spacer dots are limited in materials selections to polymers that can be manufactured into small beads or UV coated from monomers.

It is also known to use photolithography to form the spacer dots 20. In these prior art methods, the spacer dots may come loose and move around within the device, thereby causing unintended or inconsistent actuations. Furthermore, contact between the conductive layers 14 and 18 is not possible where the spacer dots are located, thereby reducing the accuracy of the touch screen, and stress at the locations of the spacer dots can cause device failure after a number of actuations. Unless steps are taken to adjust the index of refraction of the spacer dots, they can also be visible to a user, thereby reducing the quality of a display located behind the touch screen.

The conductive layers, 14 and 18 have stringent performance requirements. A typical sheet resistivity requirement is between 100 and 600 ohms per square, uniformity must be very high, and durability to over a million actuations is required. A transparency in excess of 85% with no coloration is also required for many applications. Various methods of providing the conductive layers 14 and 18 are known in the prior art, for example the use of indium tin oxide (ITO) or conductive polymers such as polythiophene. However, ITO tends to crack when stressed and conductive polymers may lack physical robustness and durability when stressed. Moreover, when ITO is employed the thickness of the coating required to provide adequate durability limits the transparency and resistivity.

U.S. Pat. No. 4,220,815 (Gibson et al.) and US Patent Application US20040090426 (Bourdelais et al.) disclose integral spacer dots on flexible cover sheets for touch screen applications. However, integral spacer dots must not have their top surfaces coated with the conductive layer to avoid electrical shorts between the first and second conductive layers, 14 and 18. US20040090426 addresses such need by high energy treatment (corona discharge treatment or glow discharge treatment) of the peaks of the spacer beads to provide surface energy difference to allow for differential surface wetting of an applied conductive layer, or by scraping of an applied conductive layer from the peaks of the spacer dots. In U.S. Pat. No. 4,220,815, cover sheet is provided with insulator islands created by deforming the cover sheet against a resilient surface with a punch. The force exerted by the punch destroys the conductive layer coated on the other side of the cover sheet. Each insulating island is associated with a corresponding dimple in the upper surface of cover sheet. Such requirements add complexity to the manufacturing process, and may negatively impact yields. Further, these approaches may not adequately electrically isolate the insulating islands, and will have reduced lifetime due to stresses induced in the cover sheet. Moreover, the dimples on the back side of the cover sheet are objectionable or, if filled, require additional materials and manufacturing steps to fill.

There is a need therefore for an improved means to form and separate the conductive layers of a touch screen and a method of making the same that improves the robustness and performance of the touch screen and reduces the cost of manufacture.

SUMMARY OF THE INVENTION

In one embodiment, the invention is directed towards a touch screen comprising: a) a substrate; b) a first conductive layer located on the substrate; c) a flexible sheet comprising a substantially planar surface and integral compressible spacer dots formed thereon, each integral compressible spacer dot having a base closest to the planar surface and a peak furthest from the planar surface; and d) a second conductive layer located on the surface of the flexible sheet, wherein the second conductive layer comprises a conductive mesh pattern and the peaks of the integral compressible spacer dots are located in non-conductive openings in the conductive mesh pattern; wherein the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers.

In a further embodiment, the invention is directed towards a method of making a touch screen, comprising the steps of: a) providing a substrate; b) forming a first conductive layer on the substrate; c) providing a flexible cover sheet comprising a substantially planar surface and integral compressible spacer dots formed thereon, each integral compressible spacer dot having a base closest to the planar surface and a peak furthest from the planar surface; d) forming a second conductive layer on the flexible cover sheet in a conductive mesh pattern, such that the peaks of the integral compressible spacer dots are located in non-conductive openings in the conductive mesh pattern; and e) locating the flexible cover sheet over the substrate such that the first and second conductive layers are positioned towards each other and separated by the integral compressible spacer dots, and such that when a force is applied to the flexible cover sheet at the location of one of the integral compressible spacer dots, the integral compressible spacer dot is compressed to allow electrical contact between the first and second conductive layers.

ADVANTAGES

The touch screen of the present invention has the advantages that it is simple to manufacture, and provides greater accuracy, robustness and clarity.

DETAILED DESCRIPTION OF THE INVENTION

Figure 1:
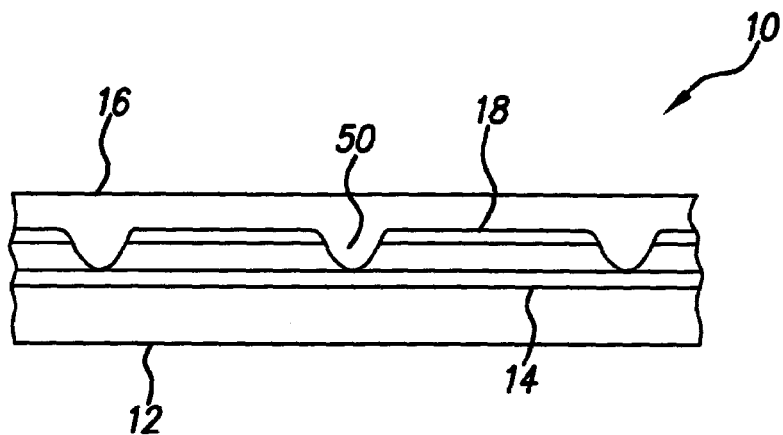
FIG. 1 is a schematic diagram showing a portion of a touch screen according to the present invention.

Referring to FIG. 1, the problems of the prior-art resistive touch screens are overcome through the use of a flexible cover sheet 16 having a second conductive layer 18 and integral compressible spacer dots 50 formed in the flexible cover sheet 16. Flexible cover sheet 16 comprises a substantially planar surface and the integral compressible spacer dots 50 are formed thereon, each integral compressible spacer dot having a base closest to the planar surface and a peak furthest from the planar surface. A second conductive layer 18 is coated over the flexible transparent cover sheet 16 between the spacer dots 50, but does not cover the peaks of the integral compressible spacer dots 50. The peaks of the integral compressible spacer dots 50 are located in non-conductive openings in the second conductive layer 18, whereby, when a force is applied to the flexible cover sheet 16 at the location of one of the integral compressible spacer dots 50, the integral compressible spacer dot is compressed to allow electrical contact between the first and second conductive layers. The word "integral" means that the compressible spacer dots 50 are formed in and comprise the same material as the flexible cover sheet 16 for example by molding or embossing. In FIG. 1, the spacer dots are shown as equal shape and spacing, but may vary according to the invention.

The integral compressible spacer dots 50 prevent the second conductive layer 18 deposited on the flexible cover sheet 16 from touching the first conductive layer 14 on the substrate 12. In accordance with the invention, the second conductive layer comprises a conductive mesh pattern and the peaks of the integral compressible spacer dots are located in non-conductive openings in the conductive mesh pattern. Because the peaks of the second conductive layer 18 in the region of the integral compressible spacer dots 50 are not coated with the conductive mesh pattern, and because the integral compressible spacer dots 50 physically separate the conductive mesh pattern of layer 18 and conductive layer 14, no current can flow between the conductive layers. While the various layers of the touch screen may be transparent or not for different applications, in a preferred embodiment each of the substrate, first conductive layer, flexible cover sheet, and second conductive layer are transparent to allow use in combination with displays or area illuminators (lamps).

Figure 2:
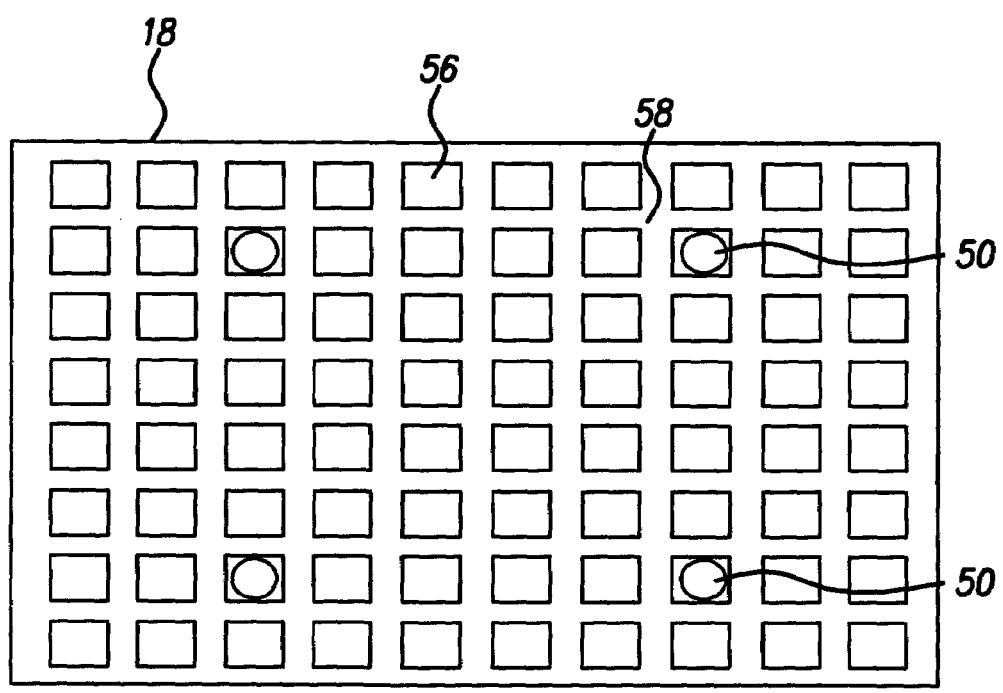
FIG. 2 is a bottom view of a portion of a flexible top sheet according to one embodiment of the present invention.
Figure 3:
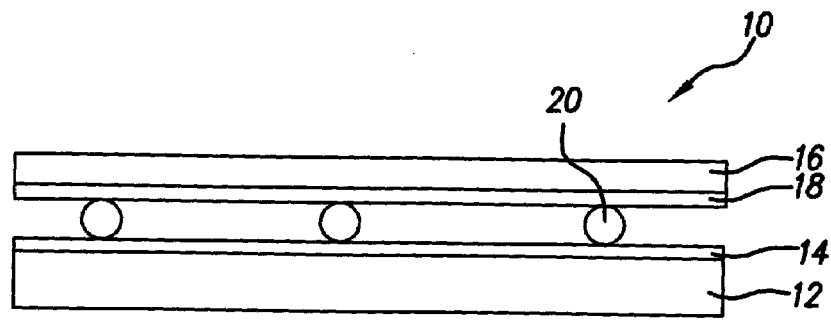
FIG. 3 is a schematic diagram showing a portion of a prior-art touch screen.
Figure 4:
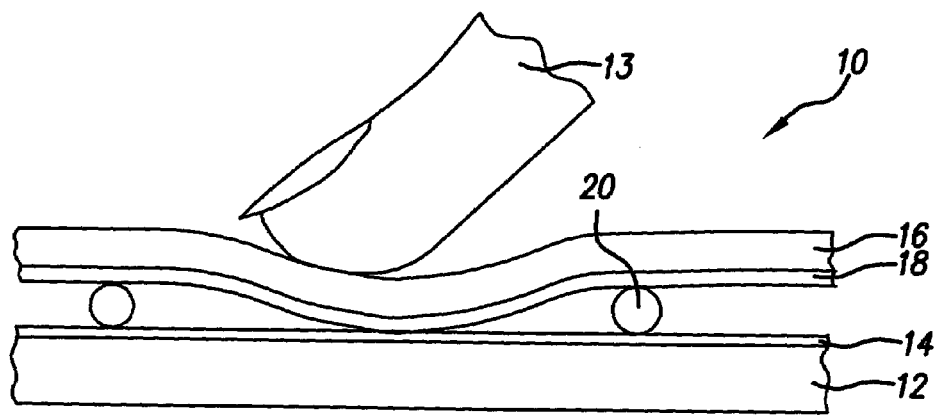
FIG. 4 is a schematic diagram illustrating the operation of the touch screen of FIG. 3.
Figure 5:
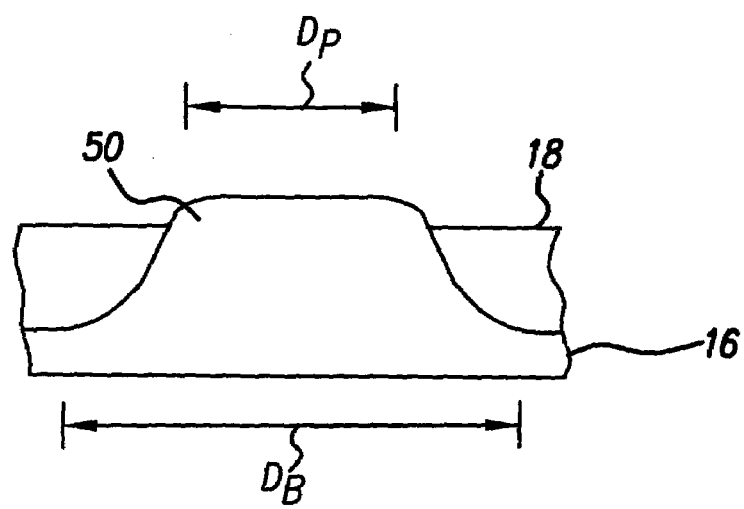
FIG. 5 is a side view of a flexible top sheet according to one embodiment of the present invention.

Referring to FIG. 2, the second conductive layer 18 is formed in a mesh having conductive areas 58 and areas 56 not in electrical contact with the conductive areas 58. The areas 56 not in electrical contact with areas 58 may not be coated with any conductive material at all, thus forming voids, or, alternatively, may have an electrical and/or insulating coating on them such that the surface of area 56 is not in electrical contact with areas 58 to form non-conductive openings in the conductive mesh pattern. The peaks of the integral compressible spacer dots are located in non-conductive openings in the conductive mesh pattern, such as in an area 56 not in electrical contact with the conductive area 58. Referring to FIG. 5, in one embodiment of the present invention, no conductive material is located on the peak of the integral compressible spacer dots. In an alternative embodiment, conductive material may be located on the integral compressible spacer dots, but not in electrical contact with the second conductive layer 18 conductive mesh pattern between the spacer dots.

As shown in FIG. 2, the conductive mesh pattern may be regular, for example it may comprise lines of conductive material deposited around the perimeter of a rectangle while the inside of the rectangle may not have any conductive material located thereon. The thickness of the lines of conductive material may vary depending on the desired characteristics of the second conductive layer 18. Other patterns may be employed, for example circular patterns or other geometric shapes.

Figure 6:
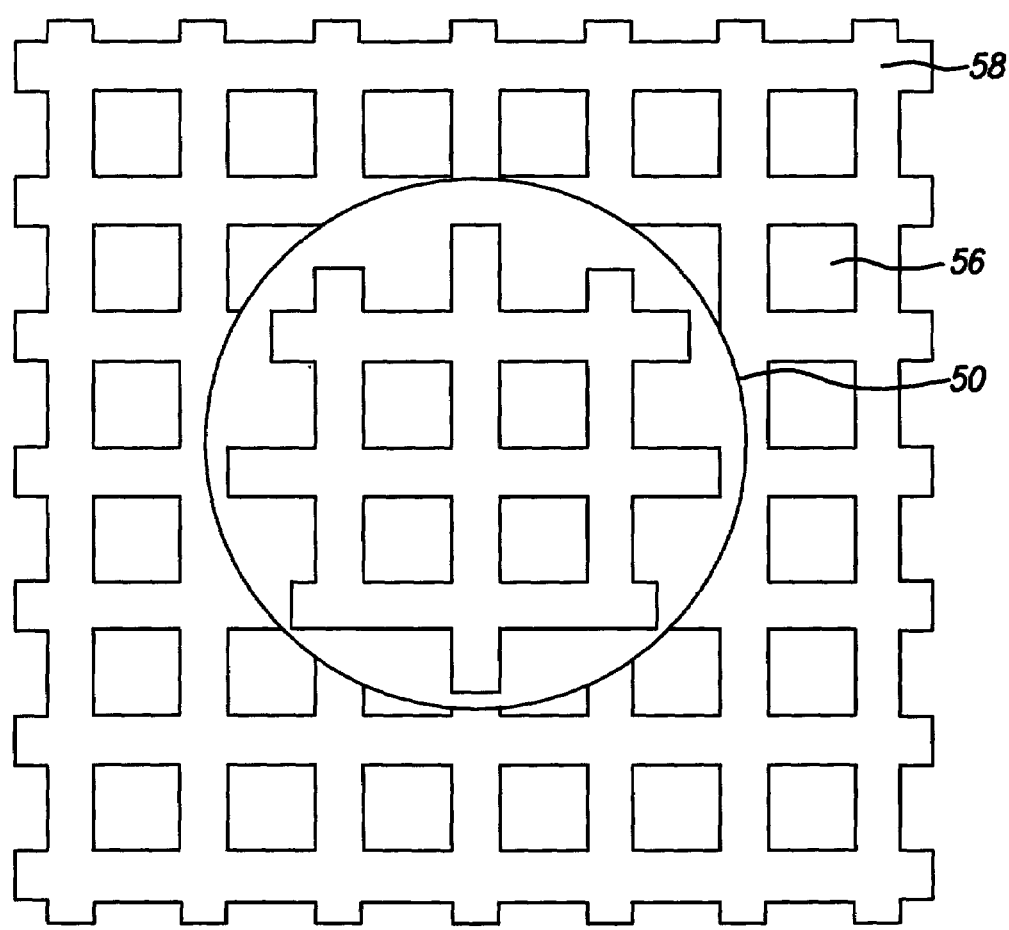
FIG. 6 is a bottom view of a portion of a flexible top sheet according to one embodiment of the present invention.

As shown in FIG. 2, the integral compressible spacer dots 50 may be smaller than the interior of the rectangle and located entirely within a rectangle. Alternatively, as shown in FIG. 6, the conductive mesh may not be regular or may have varying patterns, for example having areas not in electrical contact with the conductive layer that are small except around the integral compressible spacer dots, where they may be large enough to accommodate an integral compressible spacer dot. In this case, it may be useful to provide conductive material around the base of the integral compressible spacer dots.

By forming a conductive mesh for the second conductive coating 18, a number of useful characteristics are provided. In a mesh, the non-conductive openings in the conductive mesh pattern may not be coated with any material. This will provide improved clarity through the conductive layer since no light will be absorbed where no material is coated.

Therefore, both transparency and color may be improved. Further, the conductive layers may be formed in a thicker layer without reducing transparency or conductivity. This provides greater robustness and durability of the coating. Hence, the preferred conductivity of the second conductive layer may be achieved together with the required transparency and durability by manipulating the relative thickness of the conductive lines in the mesh, the width of the conductive lines, and the size of the non-conductive (or not electrically connected) opening areas within the mesh.

Figure 7:
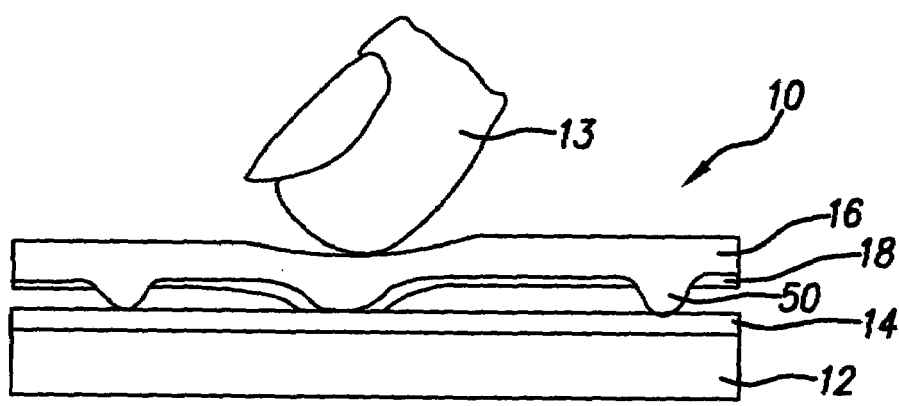
FIG. 7 is a schematic diagram illustrating the operation of the touch screen shown in FIG. 1.

Referring to FIG. 7, in operation, the integral compressible spacer dots 50 prevent the second conductive layer 18 deposited on the flexible cover sheet 16 from touching the first conductive layer 14 on the substrate 12. Because the peaks of the integral compressible spacer dots 50 are not in electrical contact with the second conductive layer 18 and physically separate the layers 18 and 16, no current can flow between the conductive layers.

When an external object such as a finger 13 or stylus deforms the flexible cover sheet 16, the flexible cover sheet 16 is pressed against the substrate 12 thereby causing the conductive layers 14 and 18 to touch and close a circuit. Substrate 12 itself may be rigid or flexible. If the substrate is flexible, however, it should be less flexible than the cover sheet, or mounted upon a surface that is less flexible than the cover sheet. If the deformation occurs on one of the integral compressible spacer dots 50 (as shown), the spacer dot is compressed so that contact is made between conductive layer 14 and conductive regions of layer 18 and current can flow between the conductive layers. Since the stylus or finger 13 is typically larger than the integral compressible spacer dot 50, the lack of conductive material at the top of the integral compressible spacer dot 50 does not inhibit the conductive layers 14 and 18 from touching. The conductive mesh is formed such that the non-conductive opening areas 56 are smaller than a typical deforming object, for example less than 100 microns across and preferably less than 50 microns across and more preferably less than 20 microns. Because the deforming object is larger than the non-conductive opening areas 56, the conductive areas 58 will form an electrical contact with the first conductive layer 14.

Because the integral compressible spacer dots 50 are an integral part of the flexible transparent cover sheet 16, they are fixed in position and cannot move or come loose as can spacer dots composed of beads in an adhesive matrix, or dots that are formed by printing or photolithography. Moreover, the integral spacer dots can be smaller than conventional spacer dots (e.g. as small as 1 micron in diameter, usually 10 to 50 microns). Additional materials, such as adhesives, are unnecessary, thereby reducing manufacturing materials and steps and further improving the optical clarity of the device.

There are at least two methods for creating the integral compressible spacer dots integral to the flexible cover sheet. The first is to take an existing, formed flexible cover sheet with no spacer dots and emboss spacer dots in the flexible cover sheet by applying heat and pressure to the flexible cover sheet in a mold that defines a reverse image of the spacer dots. The heat and pressure reforms the flexible cover sheet so that the flexible cover sheet will have integral compressible spacer dots when the mold is removed. Such a mold can be, for example, a cylinder that rolls over a continuous sheet of flexible cover sheet material. In a second method melted polymer may be coated over the mold and forced into the cavities (for example by injection roll molding), allowed to cool, and then lifted from the mold. The mold may be provided with the cavities through conventional means, for example machining, bead blasting or etching. Electromechanical engraving and fast-tool servo processes which may be used to form a patterned cylinder mold for use in the present invention are also described in copending, commonly assigned U.S. Ser. No. 10/987,467, the disclosure of which is hereby incorporated by reference. The base of the dot 50 (where it is connected to the sheet 16) may be the maximum size of the spacer dot to facilitate the extraction of the shaped material from the mold. The molding process may be continuous roll molding.

With either method, a great variety of spacer dot shapes are possible, for example, cylinders, cubes, spheres, hemispheres, cones and pyramids. The spacer dot shape is dependent on a number of considerations, for example, the method used for manufacturing, the size of the object used to deform the cover sheet, the size of the dots, the flexible cover sheet material, and the number of activations of the device over its useable lifetime.

In one embodiment of the invention, the integral compressible spacer dots of the invention may have a flat-topped circularly cylindrical shape. A circular cylinder provides for specular light transmission and has impact resistance. Further, the ends of the cylinders can provide excellent optical contact with the substrate. The diameter and height of the cylinders can be adjusted to provide the desired compression profile. As used herein compression profile means the ability of the spacer dots to undergo the desired compression and expansion.

In another embodiment of the invention, the integral compressible spacer dots may be hemisphere-shaped. The hemisphere provides a precision gap as well as high light transmission. The hemisphere also provides excellent compression and fatigue characteristics. In another embodiment of the invention, the integral compressible spacer dots may be cylinder-shaped having rectangular cross sections. A rectangular compressible spacer dot (for example a cube) provides impact resistance as well as a precision optical spacing. In another embodiment, the integral compressible spacer dot may comprise a pyramid shape, which may have a flat top. A pyramid provides a precision optical gap as well as some light directing. A 45-degree pyramid in air will tend to focus transmitted light into a line perpendicular to the base of the pyramid providing both optical spacing as well as light directing. Further, the pyramid and hemisphere shapes provide a more rapidly changing compression gradient as the shape is compressed.

The flexible cover sheet having the integral compressible spacer dots is preferably constructed from a polymer. In certain embodiments, a transparent flexible cover sheet may be desired, particularly in combination with touch screen devices comprising transparent substrates. A transparent polymeric material may provide high light transmission properties, is inexpensive and a sheet of polymeric material can easily be formed with integral compressible spacer dots. Suitable polymer materials include polyolefins, polyesters, polyamides, polycarbonates, cellulosic esters, polystyrene, polyvinyl resins, polysulfonamides, polyethers, polyimides, polyvinylidene chloride, polyethers, polyvinylidene fluoride, polyurethanes, polyphenylenesulfides, polytetrafluoroethylene, polyacetals, polysulfonates, polyester ionomers, and polyolefin ionomers as well as copolymers and blends thereof. Polycarbonate polymers have high light transmission and strength properties. Copolymers and/or mixtures of these polymers can be used.

Polyolefins particularly polypropylene, polyethylene, polymethylpentene, and mixtures thereof are suitable. Polyolefin copolymers, including copolymers of propylene and ethylene such as hexene, butene and octene can also be used.

Polyolefin polymers are suitable because they are low in cost and have good strength and surface properties and have been shown to be soft and scratch resistant.

The polymeric materials used to make flexible transparent cover sheet in preferred embodiments of this invention preferably have a light transmission greater than 92%. A polymeric material having an elastic modulus greater than 500 MPa is suitable. An elastic modulus greater than 500 MPa allows for the integral compressible spacer dots to withstand the compressive forces common to touch screens. Further, an elastic modulus greater than 500 MPa allows for efficient assembly of a touch screen as the dots are tough and scratch resistant.

A spacer dot integral to the flexible cover sheet significantly reduces unwanted reflection from an optical surface such as those present in prior art touch screens that utilize polymer beads. An integral spacer dot also provides for superior durability as the dot location is fixed in the flexible cover sheet of the invention and is not subject to movement during vibration or extended use. The integral compressible spacer dots of the invention preferably have heights between 2 and 100 micrometers, more preferably between 2 and 50 micrometers, and most preferably between 10 and 50 micrometers, although shorter or taller spacer dots might be desired in some applications. The height of the spacer dot should put enough distance between the top of the spacer dot and the conductive coating on the substrate so that inadvertent electrical contact between conductive coating on the substrate and the conductive coating on the flexible sheet can be avoided, at least when no touch is applied to the touch screen. In particular, the height should be at least somewhat greater than the size of possible asperities or other defects in the conductive coating(s) that could potentially bridge the gap if the spacer dots were not tall enough. In general, larger height of the spacer dots means a lower probability of inadvertent electrical contact and a higher actuation force. A height less than 10 micrometers, and in particular less than 2 micrometers, may not provide sufficient spacing for the two conductive layers resulting in false actuation. A height greater than 50 micrometers, and in particular greater than 100 micrometers, separating the layers may require too high a compression force to connect the two conductive layers and thus may be problematic.

A desired maximum diameter for the spacer dots generally depends on their heights, so that the ratio of height to diameter is often the relevant quantity, although the absolute value of the diameter may also be important. Dots having a smaller diameter may be less visible to a user. Dots having a smaller diameter may also lead to better electronic performance of the touch panel due to less total area coverage of the spacer dots. Very large dots may decrease touch screen resolution and/or increase the activation force. In illustrative cases, spacer dot maximum diameters may be in the range of 1 to 60 micrometers, although smaller or larger spacer dots might be desired in some applications. In some embodiments, the spacer dots preferably have height to width ratios of between 0.5 and 3.0. It has been found that this range of aspect ratios enables long lasting touch screen spacer dots that are compressible and durable.

The integral compressible spacer dots preferably are spaced apart by a distance of greater than 0.25 millimeter, more preferably greater than 1 millimeter. Spacing less than 0.25 millimeter may require compressive forces that are too high to achieve contact between the two conductive layers. The polymer and dot profile used for the flexible cover sheet with integral compressible spacer dots according to this invention preferably provide for elastic deformation of greater than 1 million actuations. Elastic deformation is the mechanical property of the spacer dot to recover at least 95% of its original height after an actuation. High-quality touch screens are also required to have a consistent actuation force over the useful lifetime of the device. Spacer dot fatigue can result in increasing actuation forces over the lifetime of the device, resulting in scratching of the surface of the touch screen and user frustration.

A variety of polymeric materials, inorganic additives, layered swellable materials having a high aspect ratio wherein the size of the materials in one dimension is substantially smaller than the size of the materials in the other dimensions, organic ions and agents serving to intercalate or exfoliate the layer materials such as block copolymers or an ethoxylated alcohols, smectite clays, nanocomposite materials, and means to form the flexible cover sheet and integral spacer dots are described in US Patent Application US20040090426, which is hereby incorporated by reference.

The size, shape, height, locations and spacing of compressible spacer dots can be chosen to meet the pressure and reliability usage specification of a particular application. The locations may form a pattern or may be random. Having the spacer dots vary in shape and/or spacing creates a touch screen that has varying levels of sensitivity, accuracy, and durability across the touch screen to tailor each area of the touch screen to its application. For example, the profile of the embossing can vary to complement a variety of flexible cover sheet materials so as to maximize the lifetime, clarity, and physical properties of the flexible cover sheet. In certain embodiments, it may be desirable to size and position the integral compressible spacer dots in a pattern that establishes at least one of differentiated minimum required activation forces and differentiated durability for selected areas of the touch screen as described in copending, commonly assigned U.S. Ser. No. 10/988,340, the disclosure of which is incorporated by reference herein.

Referring to FIG. 5, the profile of a truncated conical spacer dot 50 that has a base diameter $D_b$ that is 75% larger than the peak diameter $D_p$ is shown integral to the flexible cover sheet 16 together with a coated conductive layer 18. This geometry has been shown to provide an excellent compression profile allowing moderate levels of compressive force applied by the user to activate the touch screen. The base diameter being 75% larger than the peak diameter provides mechanical toughness, reduces dot wear and provides for over 1 million actuations before a 5% loss in height. A suitable material for the compressive dot illustrated in FIG. 5 is a blend of polyester and polycarbonate where the polycarbonate is present in the amount of 10% by weight of the polyester.

Figure 10:
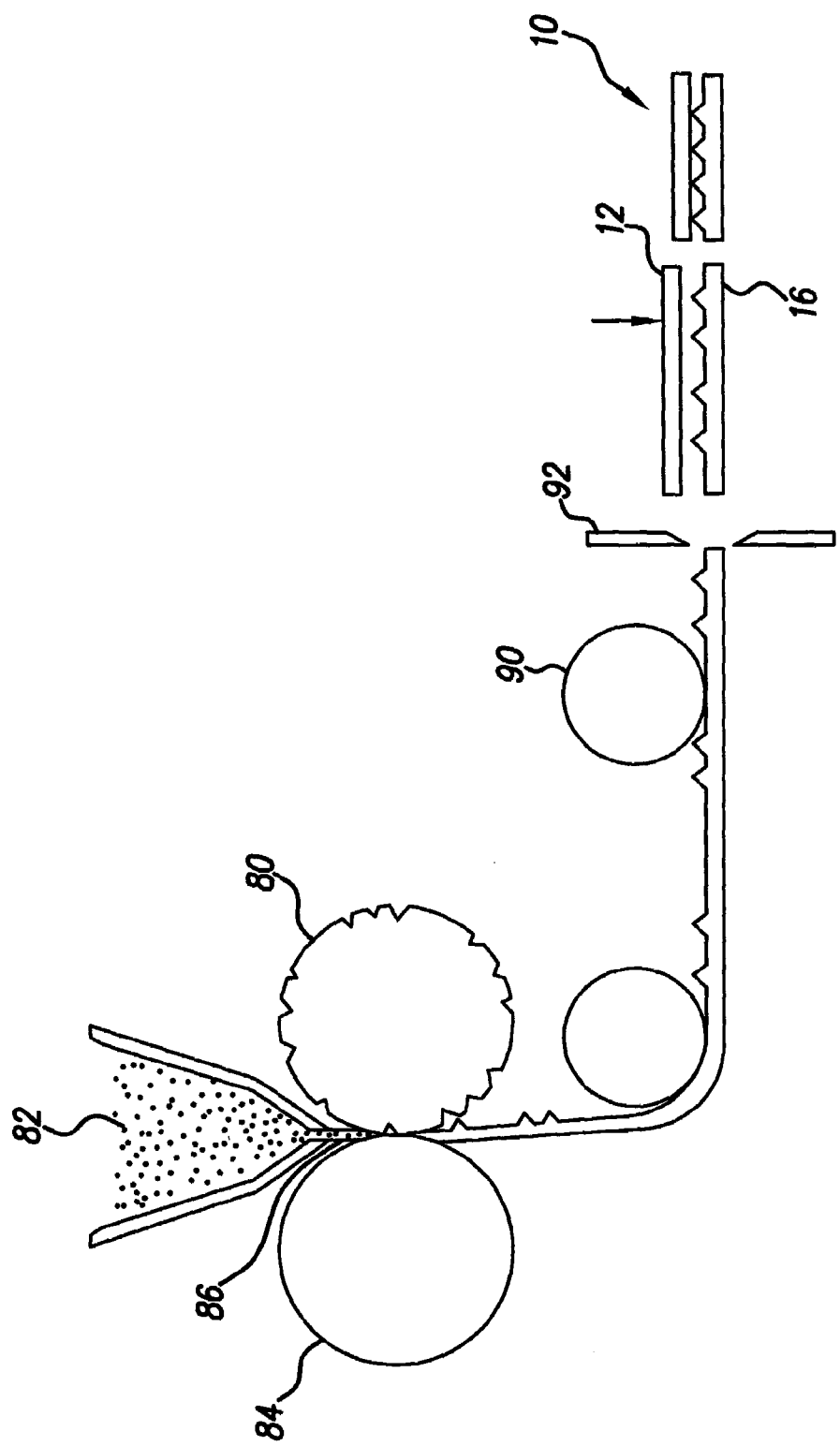
FIG. 10 is a schematic diagram of a manufacturing process useful with the present invention.

Referring to FIG. 10, in a preferred embodiment of the present invention, the integral spacer dots and flexible sheet are injection roll molded as a single unit. In the injection roll molding process a polymer 82 is heated above its melting point, and is injected under pressure into a nip 86 formed by a patterned roller 80 and an elastomer-covered backing roller 84 in direct contact with the patterned roller 80. The patterned roller 80 has a pattern of cavities for forming the integral spacer dots. The patterned roller contains the inverse of the desired pattern of spacer dots on the flexible sheet. The patterned roller contains the patterns and variation in shape and spacing of the spacer dots. As the polymer is injected into the nip 86, some of the melted polymer fills the cavities of the patterned roller to form the integral spacer dots and the balance of the polymer is squeezed into a flat sheet having the integral spacer dots. After the integral spacer dots and flexible cover sheet have been formed, the flexible cover sheet with integral spacer dots is mechanically released from both of the rollers.

The pattern roller 80 may be created by different methods, for example machining, bead blasting or etching. The base of the dot 50 (where it is connected to the sheet 16) may be the maximum size of the spacer dot to facilitate the extraction of the shaped material from the mold. The molding process may be continuous roll molding.

Next, a conductive layer mesh pattern is applied on the flexible cover sheet, between the integral spacer dots. Conductive polymers may be inkjet print deposited on the surface and registered with the integral compressible spacer dots to avoid coating the integral compressible spacer dots and to provide the mesh pattern. Alternatively, contact printing, for example with a roller 90 having a pattern of conductive material, may be employed to coat the flexible cover sheet. The use of integral spacer dots in a predetermined pattern facilitates registration of a conductive pattern mesh coating with the spacer dots. Moreover, the spacer dots themselves may be used to register the pattern coating device, e.g., an ink jet deposition system.

Alternatively, the surface of the flexible cover sheet may be entirely coated with a curable material that is conductive when cured. Suitable coating methods including curtain coating, roll coating and spin coating, slide coating, patterned gravure coating, blade coating, electro-photographic coating and centrifugal coating may be used. Once coated, the material may be cured in a pattern, for example by exposure to light or heat using, for example lasers. Once the pattern is cured, the un-cured material may be removed to leave a patterned conductive coating. Mechanical or optical masks may be employed.

The conductive coating may have a resistivity of between 100 and 600 ohms/square. The resistivity may be varied by adjusting the thickness of deposition or by adjusting the mesh pattern. In preferred embodiments, the conductive layer is transparent, and may be formed, e.g., from materials which include indium tin oxide, antimony tin oxide, electrically conductive polymers such as substituted or unsubstituted polythiophenes, substituted or unsubstituted polypyrroles, single-wall carbon nanotubes, and substituted or unsubstituted polyanilines. Preferred electrically conducting polymers for the present invention include polypyrrole styrene sulfonate (referred to as polypyrrole/poly (styrene sulfonic acid) in U.S. Pat. No. 5,674,654), 3,4-dialkoxy substituted polypyrrole styrene sulfonate, and 3,4-dialkoxy substituted polythiophene styrene sulfonate. The most preferred substituted electronically conductive polymers include poly(3,4-ethylene dioxythiophene styrene sulfonate).

As further illustrated in FIG. 10, the web of flexible cover sheet material with integral spacer dots and conductive coating is cut 92 into individual cover sheets 16 and applied to a substrate 12 of a touch screen 10. Touch screens in accordance with the invention may be used in conjunction with any flat panel display or lamp, including but not limited to OLED and liquid crystal display devices. Accordingly, it is further contemplated that the flexible cover sheet may be cut into the desired size for application to an LCD or OLED flat-panel display or other OLED device.

Figure 8:
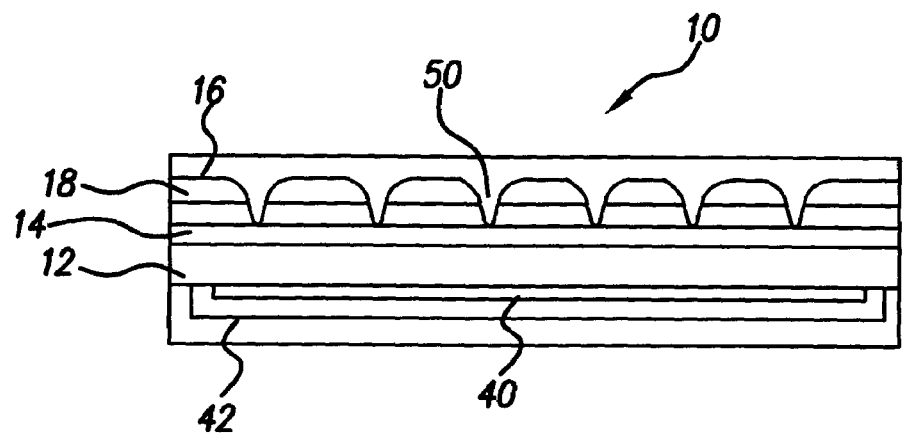
FIGS. 8 and 9 are schematic drawings of touch screens in combination with flat-panel devices, each illustrating different embodiments of the invention.
Figure 9:
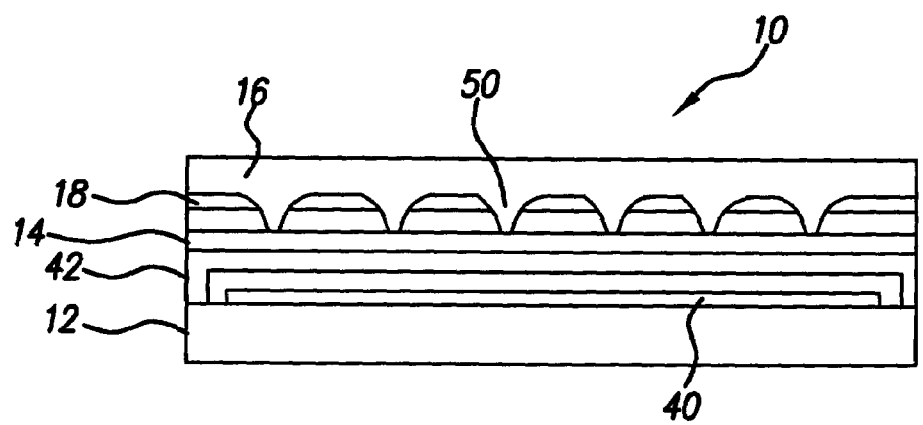

Referring to FIGS. 8 and 9, e.g., the touch screen of the present invention can be integrated into a flat-panel display by using either the cover or the substrate of the flat-panel display as the transparent substrate 12 of the touch screen. The substrate may be rigid or flexible. The flat-panel display may emit light through a transparent cover or through a transparent substrate. As shown in FIG. 8, a flat-panel organic light emitting diode (OLED) display with an integrated touch screen includes a substrate 12, OLED materials 40 and encapsulating cover 42 for the OLED display. On the opposite side of the substrate 12, the touch screen includes the first conductive layer 14 and the flexible transparent cover sheet 16 having a second conductive layer 18 and integral compressible spacer dots 50. The flat panel display device may also be a liquid crystal display device.

As shown in FIG. 9, an OLED display with an integrated touch screen includes a substrate 12, OLED materials 40, and an encapsulating cover 42 for the OLED display. On the opposite side of the encapsulating cover 42, the touch screen includes the first conductive layer 14 and the flexible transparent cover sheet 16 having a second conductive layer 18 and integral compressible spacer dots 50. The flexible sheet may be provided with a pressure sensitive adhesive opposite the spacer dots to adhere the flexible sheet to a device.

The entire contents of the patents and other publications referred to in this specification are incorporated herein by reference.

The invention has been described in detail with particular reference to certain preferred embodiments thereof, but it will be understood that variations and modifications can be effected within the spirit and scope of the invention.

PARTS LIST

10 resistive touch screen
12 substrate
13 finger
14 first conductive layer
16 cover sheet
18 second conductive layer
20 spacer dots
40 OLED materials
42 encapsulating cover
50 integral compressible spacer dots
56 non-conductive areas
58 conductive areas
80 patterned roller
82 polymer
84 backing roller
86 nip
90 patterned roller
92 cut step

The invention claimed is:

1. A touch screen comprising:
   a) a substrate;
   b) a first conductive layer located on the substrate;
   c) a flexible sheet comprising a substantially planar surface and integral compressible spacer dots formed thereon, each integral compressible spacer dot having a base closest to the planar surface and a peak furthest from the planar surface; and
   d) a second conductive layer located on the surface of the flexible sheet, wherein the second conductive layer comprises a conductive mesh pattern and the peaks of the integral compressible spacer dots are located in non-conductive openings in the conductive mesh pattern;
   wherein the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers.

2. The resistive touch screen of claim 1, wherein the substrate, first conductive layer, flexible cover sheet, and second conductive layer are transparent.

3. The touch screen of claim 1 wherein the integral compressible spacer dots are not coated with an electrical conductor.

4. The touch screen of claim 1 wherein the integral compressible spacer dots are at least partially coated with an electrically conductive material not in electrical contact with the second conductive layer mesh pattern located on the surface of the flexible sheet.

5. The touch screen of claim 1 wherein the conductive mesh forms a regular pattern.

6. The touch screen of claim 1 wherein the conductive mesh forms a rectangular pattern having conductive lines around the perimeter of the rectangle and a non-conductive area within the rectangle.

7. The touch screen of claim 6 wherein the integrated compressible spacer dots are located within the rectangle.

8. The touch screen of claim 1 wherein the conductive mesh forms a pattern having first non-conductive areas of a first size surrounded by a conductive area and second non-conductive areas of a second size surrounded by a conductive area.

9. The touch screen of claim 8 wherein the integrated compressible spacer dots are located within the second non-conductive areas.

10. The touch screen of claim 1 wherein the integrated compressible spacer dots are larger than the non-conductive openings.

11. The touch screen of claim 1, wherein the flexible sheet comprises one of the group including: polymer, polyolefin polymer, polyester, polycarbonate, and a blend of polyester and polycarbonate.

12. The touch screen of claim 1, wherein the integral compressible spacer dots comprise cylinder-shaped dots, cube-shaped dots, pyramid-shaped dots, cone-shaped dots, or sphere-shaped dots.

13. The touch screen of claim 1, wherein the substrate comprises a rigid material.

14. The touch screen of claim 1, wherein the second conductive layer comprises an electrically conductive polymer.

15. The touch screen of claim 14, wherein the conductive layer comprises one of the group including polypyrrole styrene sulfonate, 3,4-dialkoxy substituted polypyrrole styrene sulfonate, and 3,4-dialkoxy substituted polythiophene styrene sulfonate, poly(3,4-ethylene dioxythiophene styrene sulfonate.

16. The touch screen of claim 14, wherein the conductive layer comprises polythiophine.

17. The touch screen claimed in claim 1 wherein the substrate is flexible.

18. The touch screen claimed in claim 1 wherein the substrate is rigid.

19. The touch screen of claim 1 wherein the touch screen substrate is a cover or substrate of a flat-panel display device.

20. The touch screen claimed in claim 19, wherein the flat-panel display device is an OLED display device.

21. The touch screen claimed in claim 19, wherein the flat-panel display device is a liquid crystal display device.

22. The touch screen of claim 1 wherein the touch screen substrate is a cover or substrate of a flat-panel lamp.

23. The touch screen claimed in claim 22, wherein the flat-panel lamp is an OLED lamp.

24. The resistive touch screen of claim 1, wherein the conductive layer comprises indium tin oxide.

25. A method of making a touch screen, comprising the steps of:
a) providing a substrate;
b) forming a first conductive layer on the substrate;
c) providing a flexible cover sheet comprising a substantially planar surface and integral compressible spacer dots formed thereon, each integral compressible spacer dot having a base closest to the planar surface and a peak furthest from the planar surface;
d) forming a second conductive layer on the flexible cover sheet in a conductive mesh pattern, such that the peaks of the integral compressible spacer dots are located in non-conductive openings in the conductive mesh pattern; and
e) locating the flexible cover sheet over the substrate such that the first and second conductive layers are positioned towards each other and separated by the integral compressible spacer dots, and such that when a force is applied to the flexible cover sheet at the location of one of the integral compressible spacer dots, the integral compressible spacer dot is compressed to allow electrical contact between the first and second conductive layers.

26. The method of claim 25 wherein the flexible sheet is provided as a web in a continuous roll, the integral spacer dots are molded in the continuous roll, and the sheet is cut from the roll.

27. The method of claim 25 wherein the spacer dots are formed in the flexible sheet by injection roll molding.

28. The method of claim 25, wherein the spacer dots are formed in the flexible sheet by applying heat and pressure to the flexible sheet by a mold including a reverse image of the spacer dots.

29. The method of claim 25, wherein conductive material is deposited through a mask to form the second conductive layer mesh pattern.

30. The method of claim 25, wherein conductive material is deposited using inkjet printing to form the second conductive layer mesh pattern.

31. The method of claim 25, wherein conductive material is deposited via contact printing to form the second conductive layer mesh pattern.

32. The method of claim 25, wherein conductive material is deposited in a continuous coating on the flexible sheet and cured in a pattern to form the second conductive layer mesh pattern.

33. The method of claim 32, wherein non-cured coating is removed from the flexible cover sheet.

* * * * *

UNITED STATES PATENT AND TRADEMARK OFFICE
CERTIFICATE OF CORRECTION

PATENT NO. : 7,196,281 B2
APPLICATION NO. : 10/987882
DATED : March 27, 2007
INVENTOR(S) : Ronald S. Cok et al.

It is certified that error appears in the above-identified patent and that said Letters Patent is hereby corrected as shown below:

| | |
|---|---|
| Claim 15, Column 11, line 52, | delete "sulfonate." and insert --sulfonate).-- . |
| Claim 16, Column 11, line 54, | delete, "polythiophine." and insert --polythiophene.-- . |

Signed and Sealed this

Thirty-first Day of July, 2007

JON W. DUDAS
*Director of the United States Patent and Trademark Office*